United States Patent
Fouad et al.

(10) Patent No.: US 11,678,362 B2
(45) Date of Patent: Jun. 13, 2023

(54) METHOD TO DYNAMICALLY CHANGE THE MINIMUM CANDIDATE RESOURCES RATIO IN MODE 2 RESOURCE SELECTION PROCEDURE OF NR V2X

(71) Applicant: Samsung Electronics Co., Ltd., Suwon-si (KR)

(72) Inventors: Yaser Fouad, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/226,957

(22) Filed: Apr. 9, 2021

(65) Prior Publication Data

US 2021/0352677 A1 Nov. 11, 2021

Related U.S. Application Data

(60) Provisional application No. 63/021,073, filed on May 6, 2020.

(51) Int. Cl.
| | | |
|---|---|---|
| *H04W 72/10* | (2009.01) | |
| *H04W 72/56* | (2023.01) | |
| *H04B 17/327* | (2015.01) | |
| *H04W 24/10* | (2009.01) | |
| *H04W 72/044* | (2023.01) | |
| *H04W 72/23* | (2023.01) | |
| *H04W 72/542* | (2023.01) | |

(52) U.S. Cl.
CPC .......... *H04W 72/56* (2023.01); *H04B 17/327* (2015.01); *H04W 24/10* (2013.01); *H04W 72/0466* (2013.01); *H04W 72/23* (2023.01); *H04W 72/542* (2023.01)

(58) Field of Classification Search
CPC ... H04W 72/10; H04W 24/10; H04W 72/042; H04W 72/0466; H04W 72/085; H04W 84/005; H04W 92/18; H04W 72/02; H04W 4/40; H04W 72/0406; H04W 72/0446; H04W 72/1242; H04W 74/0816; H04B 17/327; H04L 5/0051; H04L 1/1825

See application file for complete search history.

(56) References Cited

U.S. PATENT DOCUMENTS

| | | |
|---|---|---|
| 10,834,641 B2 | 11/2020 | Cai et al. |
| 2008/0082709 A1 | 4/2008 | Lee et al. |
| 2018/0279259 A1 | 9/2018 | Gulati et al. |
| 2019/0132818 A1* | 5/2019 | Yasukawa ......... H04W 74/0816 |
| 2019/0182840 A1* | 6/2019 | Feng ................. H04W 74/0816 |
| 2020/0029245 A1 | 1/2020 | Khoryaev et al. |
| 2020/0029340 A1 | 1/2020 | He et al. |

(Continued)

*Primary Examiner* — Kiet Tang
(74) *Attorney, Agent, or Firm* — Lewis Roca Rothgerber Christie LLP (57) ABSTRACT

Method of resource selection where a selection window with a total number of resources is set. The method includes setting a sensing window and monitoring slots by decoding a physical sidelink control channel (PSCCH) and measuring a reference signal received power (RSRP), setting a threshold, excluding any restricted resources from the total number of resources, excluding any occupied resources from the total number of resources, and determining if an initial number of remaining resources is greater than or equal to an initial percentage of the total number of resources.

20 Claims, 7 Drawing Sheets

(56) References Cited

U.S. PATENT DOCUMENTS

2020/0037343 A1   1/2020  He et al.
2021/0266895 A1*  8/2021  Wang .................... H04L 5/0051
2022/0085923 A1*  3/2022  Ye ......................... H04L 1/1825

* cited by examiner

METHOD TO DYNAMICALLY CHANGE THE MINIMUM CANDIDATE RESOURCES RATIO IN MODE 2 RESOURCE SELECTION PROCEDURE OF NR V2X

CROSS-REFERENCE TO RELATED APPLICATIONS

This application claims the benefit of U.S. Provisional Patent Application No. 63/021,073 filed on May 6, 2020 in the United States Patent and Trademark Office, the entire contents of which are herein incorporated by reference.

FIELD

The present disclosure is generally related to. In particular, the present disclosure is related to Mode 2 Resource selection in New Radio (NR) Vehicle to Everything (V2X).

BACKGROUND

In NR V2X, Step 1 of the Mode 2 resource selection procedure provides a set of resources for higher layer that can be used for transmission. In Step 2, the transmission resources are selected randomly by the higher layer. Hence, to reduce the probability of collision, there exists a minimal ratio X % between the resources passed to Step 2 and the total available resources within the resource selection window. This concept was adopted from LTE wherein the ratio, X %, is set to 20%. However, unlike LTE, NR V2X involves both periodic and aperiodic traffic and is expected to require stringent latency and reliability requirements. Hence, it is necessary to 1) allow the system to have different values of X % based on priority to guarantee the reliability; and 2) allow the system to dynamically change the value of X % within Step 1 of the Mode 2 resource selection procedure to avoid passing resources that would result in collisions to the higher layers.

SUMMARY

A method of resource selection, the method comprising: setting, by a user equipment (UE), a selection window; setting, by the UE, a sensing window and monitoring slots by decoding a physical sidelink control channel (PSCCH) and measuring a reference signal received power (RSRP); setting, by the UE, a threshold; defining a set of a total number of resources based on the selection window; excluding based on the sensing window, by the UE, any restricted resources from the total number of resources; excluding based on the threshold, by the UE, any occupied resources from the total number of resources; and determining, by the UE, if an initial number of remaining resources is greater than or equal to an initial percentage of the total number of resources.

The method comprising reporting the number of remaining resources to a higher layer when the initial number of remaining resources is greater than or equal to the initial percentage of the total number of resources.

The method comprising at least one iteration including: increasing the threshold, when the initial number of remaining resources is less than the initial percentage of the total number of resources, and redetermining if a subsequent number of remaining resources is greater than or equal to a subsequent percentage of the total number of resources.

The method wherein the subsequent percentage varies for each iteration, wherein a factor by which the subsequent percentage changes depends on an iteration number or a transmission priority.

The method wherein the subsequent percentage varies for each iteration, wherein the subsequent percentage is selected from a preconfigured set.

The method wherein the subsequent percentage varies for each iteration, wherein a factor by which the subsequent percentage changes depends on a CBR or a ratio between aperiodic and periodic traffic.

The method wherein the resource selection window is divided into at least a first section with a first percentage and a second section with a second percentage, wherein the first percentage and the second percentage vary in each iteration, respectively.

The method wherein the subsequent percentage varies for each iteration, wherein the subsequent percentage is selected, from a preconfigured set, based on a traffic priority.

The method wherein the occupied resources are occupied by a UE and the corresponding RSRP of the occupied resources is greater than or equal to the threshold.

The method wherein the resource selection window is divided into at least a first section with a first percentage and a second section with a second percentage.

A system for resource selection, comprising: a processor; and a memory storing non-transitory processor-executable instructions that, when executed by the processor, cause the processor to: set a selection window; set a sensing window and monitoring slots by decoding a physical sidelink control channel (PSCCH) and measuring a reference signal received power (RSRP); set a threshold; define a set of a total number of resources based on the selection window; exclude, based on the sensing window, any restricted resources from the total number of resources; exclude, based on the threshold, any occupied resources from the total number of resources; and determine if an initial number of remaining resources is greater than or equal to an initial percentage of the total number of resources.

The system comprising reporting the number of remaining resources to a higher layer when the initial number of remaining resources is greater than or equal to the initial percentage of the total number of resources.

The system comprising at least one iteration including: increasing the threshold, when the initial number of remaining resources is less than the initial percentage of the total number of resources, and redetermining if a subsequent number of remaining resources is greater than or equal to a subsequent percentage of the total number of resources.

The system wherein the subsequent percentage varies for each iteration, wherein a factor by which the subsequent percentage changes depends on an iteration number or a transmission priority.

The system wherein the subsequent percentage varies for each iteration, wherein the subsequent percentage is selected from a preconfigured set.

The system wherein the subsequent percentage varies for each iteration, wherein a factor by which the subsequent percentage changes depends on a CBR or a ratio between aperiodic and periodic traffic.

The system wherein the resource selection window is divided into at least a first section with a first percentage and a second section with a second percentage, wherein the first percentage and the second percentage vary in each iteration, respectively.

The system wherein the subsequent percentage varies for each iteration, wherein the subsequent percentage is selected, from a preconfigured set, based on a traffic priority.

The system wherein the occupied resources are occupied by a UE and the corresponding RSRP of the occupied resources is greater than or equal to the threshold.

The system wherein the resource selection window is divided into at least a first section with a first percentage and a second section with a second percentage.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In Fifth Generation (5G) New Radio (NR) Vehicle to Everything (V2X), Mode 2 resource allocation procedure is used for sidelink communications. In this procedure, two steps are applied (Step 1 to find a set of resources with low chances of collisions and Step 2 to randomly select one or more of these resources). There exists a requirement on the minimum number of resources that need to be passed to Step 2 (i.e., X % where X is the ratio between the resources obtained from step 1 to the total number of available resources). Mode 2 resource selection may be used by User Equipments (UEs) to select resources for transmission. In this mode, the UEs define a sensing window and a resource selection window. In the sensing window, the UEs identify the resources (within the resource selection window) that are reserved by neighboring UEs. This is done by decoding the received Sidelink Control Information (SCI) within the sensing window, and accordingly identifying the indicated resources for future transmissions. The resources indicated by the SCIs are considered to be occupied if the Reference Signal Received Power (RSRP) corresponding to an SCI is above a certain RSRP threshold. The threshold may be based on a priority indicated by the SCI. The resources indicated by an SCI are excluded from the resource selection window if the RSRP is above a certain threshold.

In resource allocation Mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp\_TX}$, in units of ms.

The following higher layer parameters affect this procedure:

t2min_SelectionWindow: internal parameter $T_{2min}$ is set to the corresponding value from higher layer parameter t2min_SelectionWindow for the given value of $prio_{TX}$.
SL-ThresRSRP_pi_pj: this higher layer parameter provides an RSRP threshold for each combination $(p_i, p_j)$, where $p_i$ is the value of the priority field in a received SCI format 0-1 and $p_j$ is the priority of the transmission of the UE selecting resources; for a given invocation of this procedure, $p_j=prio_{TX}$.
RSforSensing selects if the UE uses the PSSCH-RSRP or PSCCH-RSRP measurement, as defined in subclause 8.4.2.1.
reservationPeriodAllowed
t0_SensingWindow: internal parameter $T_0$ is defined as the number of slots corresponding to t0_SensingWindow ms.
The resource reservation interval, $P_{rsvp\_TX}$, if provided, is converted from units of ms to units of logical slots, resulting in $P_{rsvp\_TX}'$.
Notation: $(t_0^{SL}, t_1^{SL}, t_2^{SL}, \ldots)$ denotes the set of slots which can belong to a sidelink resource pool.

To ensure that the UE can support the value of X, the UE might need to significantly increase its threshold levels thus potentially creating interference to its neighboring high priority. The interference may also be magnified when the resource selection window is not sufficiently long. Additionally, processing burden might be added to the UE as the UE might perform the resource selection procedure multiple times until the minimum requirement for the ratio is met. At the same time, reducing the value of X may result in collisions between UE transmissions as limited resources will be available for resource selection by higher layers. Additionally, if the ratio is required to be maintained for a portion of the resource selection window (i.e., a new ratio is defined between the available resources within the duration that can be indicated by the SCI to the total number of resources within the same duration), it may result in significantly increasing the RSRP threshold due to the limited duration. Subsequently the system performance may deteriorate. Finally, higher-priority transmission might require higher values of X when compared to lower-priority transmission in order to reduce the probability of collision.

In this disclosure, techniques are provided to dynamically adjust the X % constraint on the number of resources in Step 1 that needs to be passed to Step 2 of the Mode 2 resource selection procedure. In particular, techniques are disclosed to iteratively adjust the X % in each of the Step 1 iterations to avoid passing resources that would result in collisions. In some embodiments, this is done by adapting the X % based on the number of iterations, the priority, the CBR (channel busy ratio), CR (channel occupancy ratio), the PDB (packet delay budget), the ratio between the periodic and aperiodic traffic or a combination thereof. In addition, multiple values of X % may be configured based on priority, whereby for each priority up to two values of X % can be used (i.e., one for the duration within the signaling window and the other for the duration of the resource selection window).

In some embodiments, the disclosed technology allows the values of X % to vary either by multiplication of a factor or by selection from a predefined set. The disclosed technology allows setting different values of {X1%, X2%} for each priority and thus offers higher flexibility to the system by having different ratios for signaling and resource selection windows.

According to some embodiments, the present technology presents several benefits:

Allows the adaptation of X % in each iteration of Step 1 of the Mode 2 resource selection procedure.
Reduces the chances of passing resources that would result into collisions to Step 2. This is done by dynamically reducing the X % requirement based on priority, CBR, CR, etc.
Offers different values of X % for signaling and resource selection windows (e.g., $X_1$%, $X_2$%) based on priority. Note that the traffic within the signaling window affected by $X_1$% will be mostly aperiodic. Hence, the proposed technology offers an $X_1$% value based on priority for aperiodic traffic.
Protects higher priority traffic by reducing the chances of interference from lower priority UEs. This is done by dynamically reducing X % based on priority which would prevent Step 1 from increasing the interference thresholds and subsequently preventing low priority UEs from accessing some resources.
Reduces the processing burden on low priority UEs by allowing Step 1 of the resource selection procedure to converge earlier.

Figure 1:
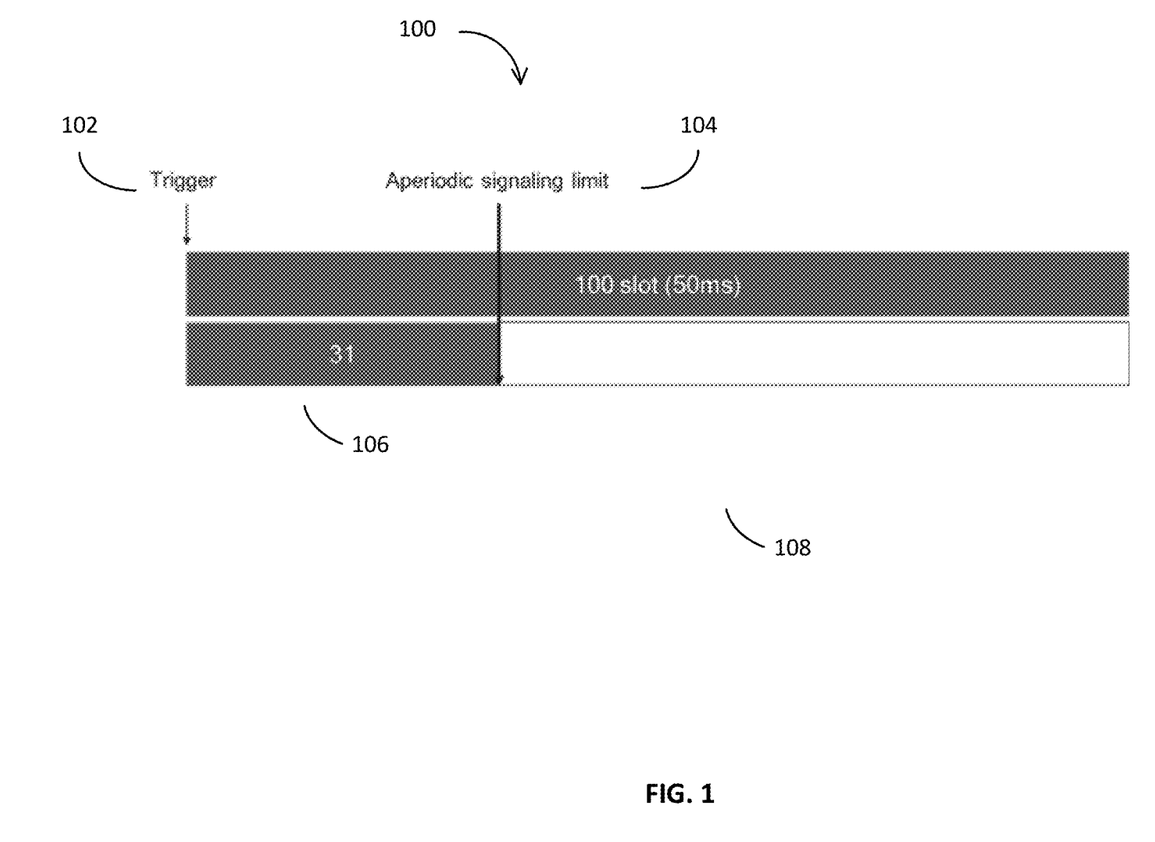
FIG. 1 illustrates a diagram of a resource selection window according to some embodiments.

Turning to FIG. 1, a resource selection window 100 is depicted. Here, resource selection window 100 has two intervals, $X_1$ 106 and $X_2$ 108. In any of the embodiments disclosed herein, maintaining separate minimal values of X % for each interval 106, 108 of the resource selection window 100 may be implemented to allow for greater flexibility. $X_1$ 106 includes periodic and aperiodic reservations, while $X_2$ 108 only includes periodic reservations. The aperiodic signaling limit 104 may be at slot 31.

In FIG. 1, traffic is assumed to be aperiodic with a packet delay budget (PDB) of 50 ms, thus there is a selection window of 100 slots having a slot duration of 0.5 ms. The time when resource selection is triggered by a trigger 102 is at slot n. Since most transmissions are likely to be reserved by a previous transmission that is no more than 31 slots before, all reservations that can affect the resource selection result will likely occur at slot m in the window [n−31, n]. Furthermore, such reservation reserves a resource at slot m+d with d in the range [0, 31]. Therefore, sensing information is mostly unavailable for 69 slots and greater than 69% of the resources will be available in the selection regardless of the initial RSRP threshold and traffic load as depicted in FIG. 1.

Since m can be uniformly distributed in [n−31, n] and d can be uniformly distributed in [0, 31], when a window is considered that contains all observable reserved resources in the future, the window size is below 20 slots in most of the cases. Correspondingly, if a window is considered that contains 90 percent of the observable reserved resources in the future, the window size is below 16 slots in most of the cases. As a result, most of the time a RSRP increase step of 3 dB cannot be triggered, regardless of the traffic load, given that more than 80% of resources in the selection window will be free by default. As a matter of fact, the RSRP threshold can only be triggered when UE approach the end of its Packet Delay Budget (PDB) as the UE shrinks its resource selection window. This has the equivalent effect of limiting the PDB of the traffic to below 31 slots, or in this case, to below 16 slots, given the above observations and the fact that current resource free threshold is 20 percent. It is likely that system performance may be heavily penalized under heavy or bursty traffic. This issue does not apply for periodic traffic.

Figure 2A:
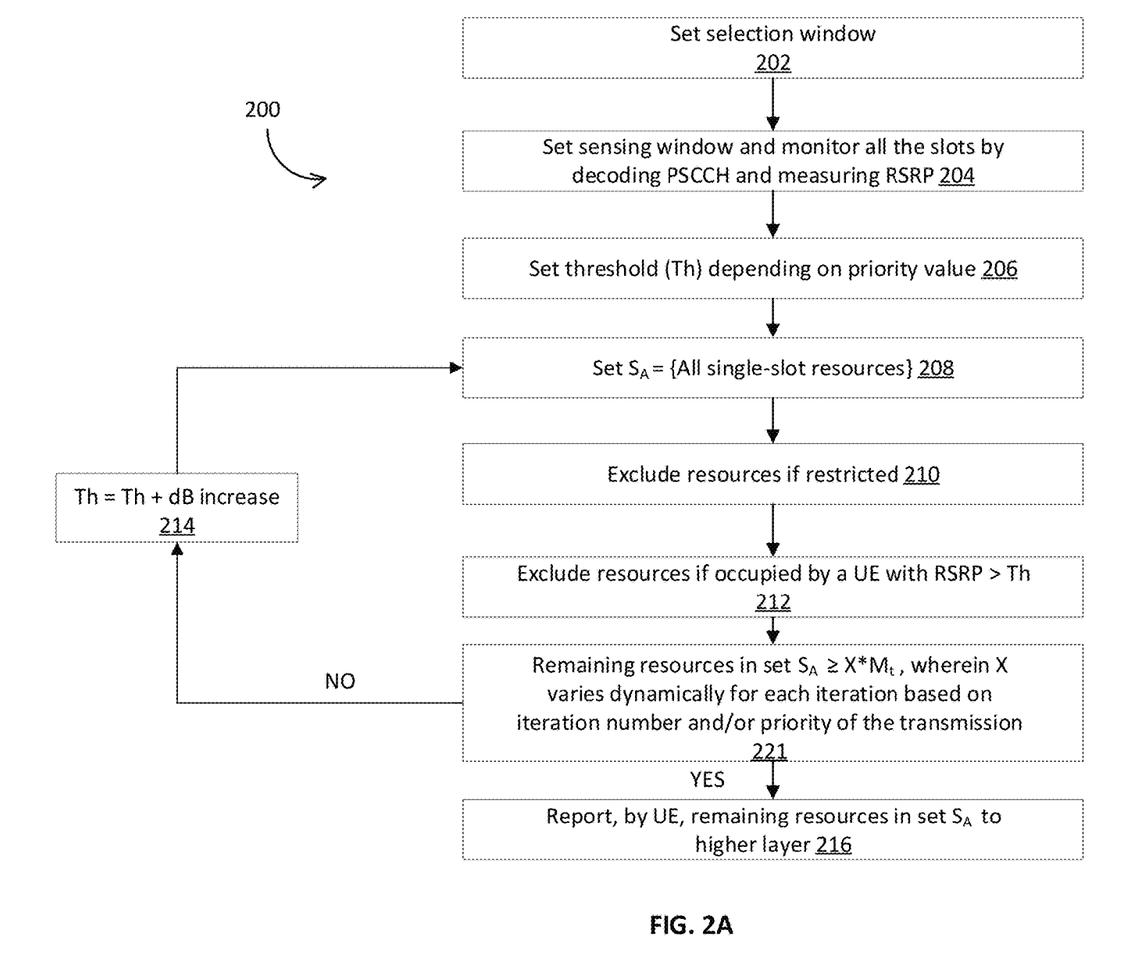
FIG. 2A illustrates a flowchart for resource selection according to some embodiments.

Turning to FIG. 2A, the following Mode 2 resource selection procedure 200 is used. The first step may be to set a selection window 202. A candidate single-slot resource for transmission $R_{x,y}$ may be defined as a set of $L_{subCH}$ contiguous sub-channels with sub-channel x+j in slot $t_y^{SL}$ where j=0, . . . , $L_{subCH}$−1. The UE may assume that any set of $L_{subCH}$ contiguous sub-channels included in the corresponding resource pool within the time interval [n+T$_1$, n+T$_2$] correspond to one candidate single-slot resource, where selection of T$_1$ is up to UE implementation under $0 \leq T_1 \leq T_{proc,1}$, where $T_{proc,1}$ is open to definition; If $T_{2min}$ is shorter than the remaining packet delay budget (in slots) then T$_2$ is up to UE implementation subject to $T_{2min} \leq T_2 \leq$ remaining packet budget (in slots); otherwise, T$_2$ is set to the remaining packet delay budget (in slots). The total number of candidate single-slot resources may be denoted by $M_{total}$ or $M_t$.

At step 204, the sensing window is defined by the range of slots [n−T$_0$, n−T$_{proc,0}$] where T$_0$ is defined above and $T_{proc,0}$ is open to definition. The UE may monitor slots which can belong to a sidelink resource pool within the sensing window except for those in which its own transmissions occur. The UE may perform the behavior in the following steps based on the decoded PSCCH and the measured RSRP in these slots.

At step 206, the internal threshold parameter Th(p$_i$) is set to the corresponding value from the higher layer parameter SL-ThresRSRP_pi_pj for p$_j$ equal to the given value of prio$_{TX}$ and each priority value p$_i$.

At step 208, the set S$_A$ is initialized to the set of all the candidate single-slot resources.

At step 210, the UE may exclude any restricted resources (e.g. due to half-duplex constraint). The UE may exclude any candidate single-slot resource $R_{x,y}$ from the set S$_A$ if it meets one, multiple, or all of the following conditions:

The UE has not monitored slot $t_m^{SL}$ in step 204.

For any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in step 212 would be met.

At step 212, the UE may exclude resources if occupied by a UE where the corresponding RSRP is above the threshold. Resources occupied by a higher priority UE usually have a lower threshold. While resources occupied by a lower priority UE usually have a higher threshold. So resources occupied by a UE with lower priority or higher priority may also be excluded if the RSRP is above the threshold (Th). The UE may exclude any candidate single-slot resource $R_{x,y}$ from the set S$_A$ if it meets the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and prio$_{RX}$, respectively according to step 204;

b. the RSRP measurement performed, according to received SCI format 0-1, is higher than Th(prio$_{RX}$);

c. the SCI format received in slot $t_m^{SL}$ or the same SCI format which, if and only if the "Resource reservation period" field is present in the received SCI format 0-1, is assumed to be received in slot(s)

$$t_{m+q \times P'_{rsvp\_RX}}^{SL}$$

determines according to step 204 the set of resource blocks and slots which overlaps with $$R_{x,y+j \times P'_{rsvp\_TX}}$$

for q=1, 2, . . . , Q and j=0, 1, . . . , C$_{reset}$−1. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and n'−m≤$P_{rsvp\_RX}$, where $t_{n'}^{SL}$=n if slot n belongs to the set ($t_0^{SL}, t_1^{SL}, \ldots, t_{T_{max}}^{SL}$), otherwise slot $t_{n'}^{SL}$ is the first slot after slot n belonging to the set ($t_0^{SL}, t_1^{SL}, \ldots, t_{T_{max}}^{SL}$); otherwise Q=1. $T_{scal}$ may be decided according to 3GPP 38.214.

At step 221, if the number of candidate single-slot resources remaining in the set S$_A$ is smaller than X·$M_{total}$, then at step 214 Th(p$_i$) is increased by a given number (e.g. 1 dB, 2 dB, 3 dB, 4, dB, 5 dB, 6 dB, 7 dB, 8 dB, 9 dB, 10 dB, or 11 dB-100 dB) for each priority value Th(p$_i$) and the procedure continues with step 208. An iteration may be defined as each time the procedure/UE/processor determines that the remaining candidates in S$_A$ is smaller than X·$M_{total}$ and has to loop back to step 208 via step 214. X varies dynamically for each iteration based on iteration number and/or priority of the transmission. For example, X may be either 10%, 15%, 20%, 25%, 30%, 35%, 40%, 45%, 50%, 55%, 60%, 65%, 70%, or 75% based on priority.

At step 221, the minimum value(s) for the ratio (e.g., X or $\{X_1, X_2\}$ if portions of the resource selection window are considered separately) varies dynamically in each iteration. The factor by which the value(s) of X changes may depend on the iteration number and/or the priority of the transmission that triggered the resource selection.

In each iteration of the resource selection procedure, the value of X may be dynamically adjusted by a given factor. The factor may be either fixed or pre-configured. The factor may depend on the priority of the transmission that triggered a resource selection. The factor may change depending on an iteration number (e.g., reduce by 1% for the first iteration and 2% for the second iteration). The factor may have different values for different portions of the resource selection windows. In particular, consider a case in which two ratios are to be preserved, one for a portion of the resource selection window and the other for the full selection window; e.g., $X_1$ and $X_2$. The decreasing factor can be different for the two ratios, thus resulting in two respectively different decreasing rates for $X_1$ and $X_2$. The two factors may also depend on the priority of the transmission that triggered the resource selection.

At step 214, the UE may increase RSRP thresholds by the given number when at least one of the following conditions holds:

a. If the number of candidate single-slot resources remaining in the set $S_A$ is less than $0.5 \cdot M_{total}$ b. The total number of candidate single-slot resources within [n+T1, n+16] is denoted by $M_{total, \, aperiodic}$. If the number of candidate single-slot resources remaining in the set $S_A$ that is within [n+T1, n+16] is less than $0.5 \cdot M_{total, \, aperioidic}$.

At step 216, if the number of candidate single-slot resources remaining in the set $S_A$ is greater than or equal to $X \cdot M_{total}$, the UE may report remaining of set $S_A$ to one or more higher layers, and the one or more high layers may randomly select a candidate resource for transmission.

Figure 2B:
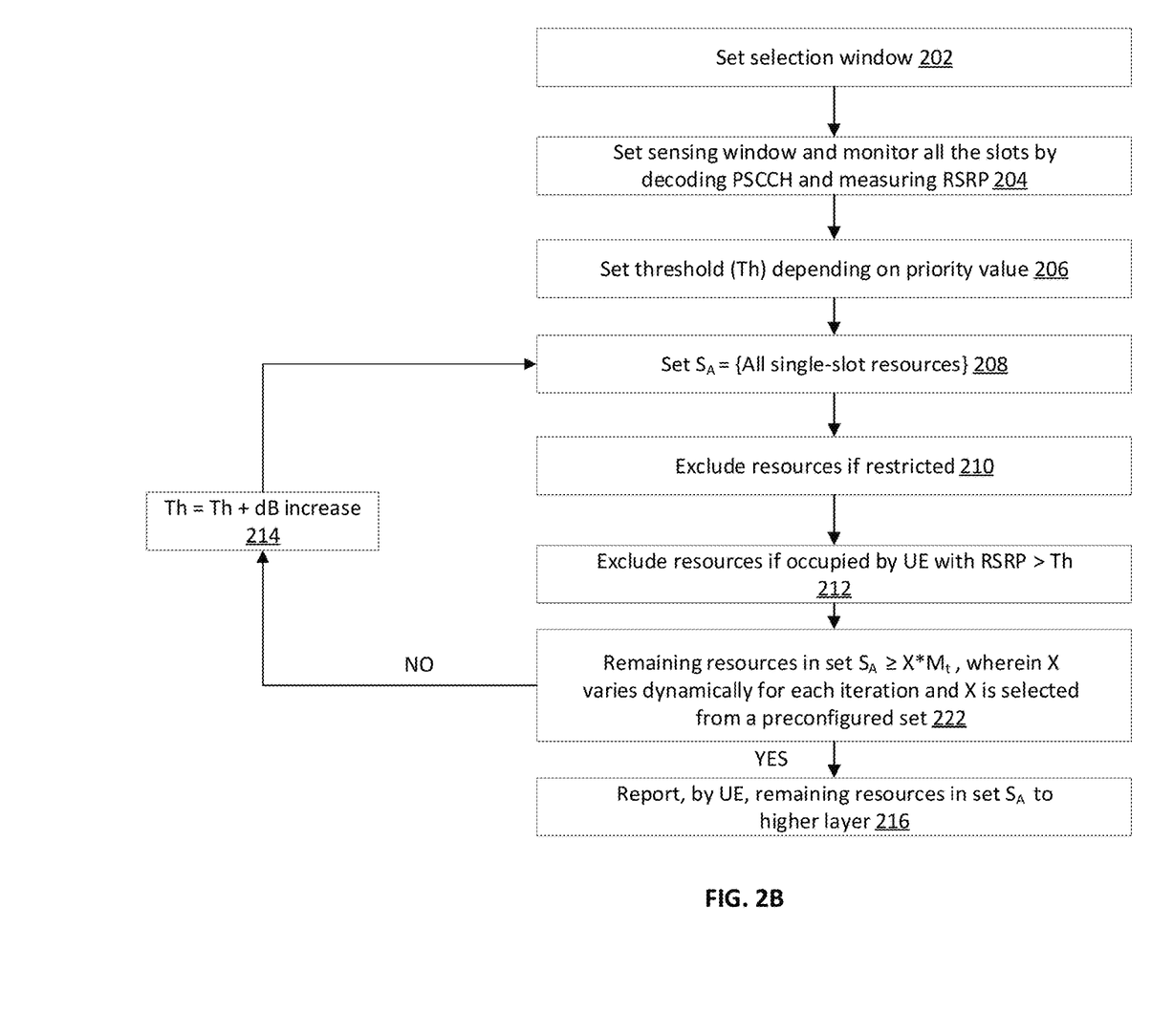
FIG. 2B illustrates another flowchart for resource selection according to some embodiments.

Turning to FIG. 2B, at step 222 the minimum value(s) for the ratio (e.g., X or $\{X_1, X_2\}$ if portions of the resource selection window are considered separately) varies dynamically in each iteration, whereby the value(s) of X is selected from a fixed/preconfigured set. The values within the set(s) may depend on the priority of the transmission that triggered the resource selection.

In each iteration of the resource selection procedure, the value of X may be changed based on an index of the iteration based on a fixed/preconfigured set of possible values.

Different sets may be defined depending on the priority of the transmission that triggered the resource selection.

Different sets may be defined for different portions of the resource selection window. For example, two ratios might be preserved in some cases (one for a portion of the resource selection window, $X_1$, and the other for the full selection window, $X_2$). A different set of values may be maintained for each ratio. The sets may also depend on the priority of the transmission that triggered the resource selection.

Figure 3A:
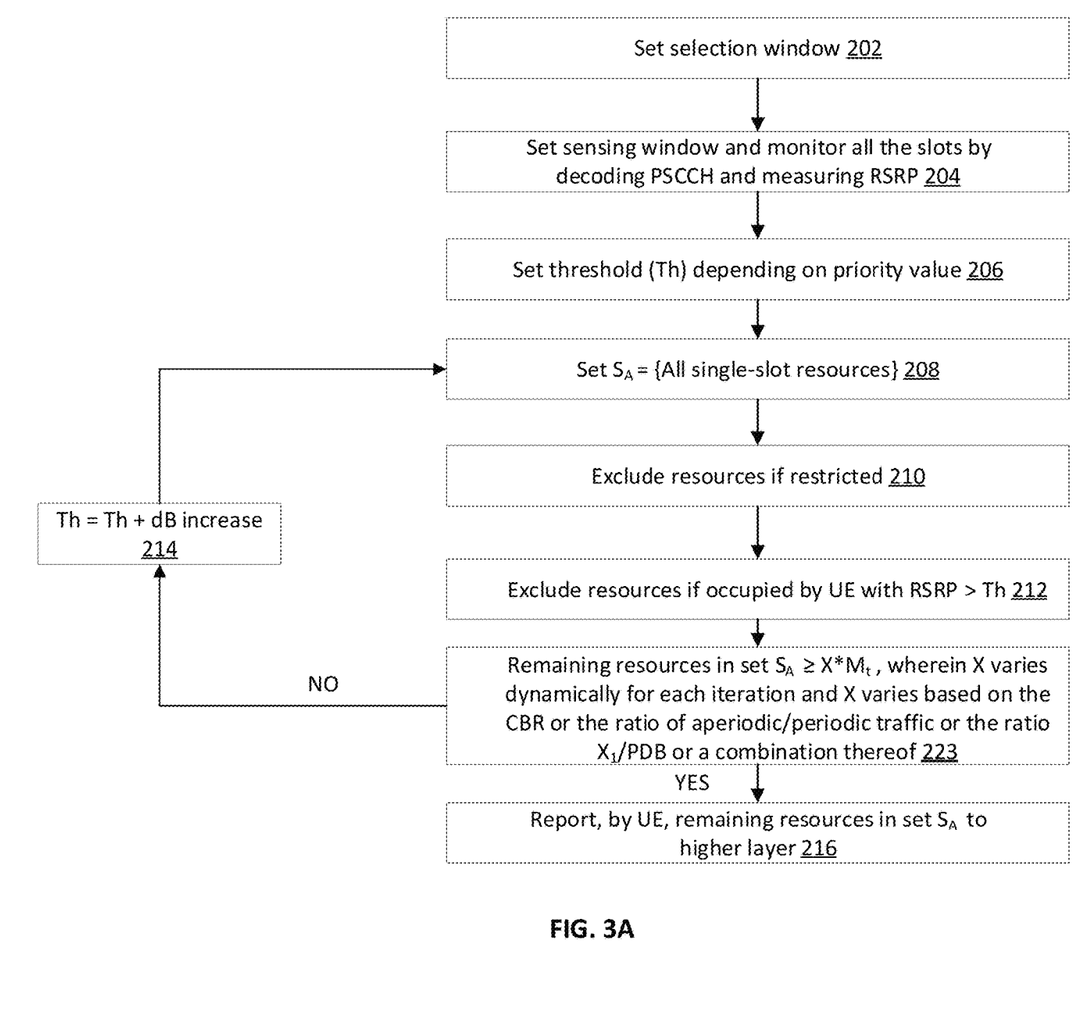
FIG. 3A illustrates a flowchart for Mode 2 resource selection according to some embodiments.

In FIG. 3A, at step 223, the minimum value(s) for the ratio (e.g., X or $\{X_1, X_2\}$ if portions of the resource selection window are considered separately) varies dynamically in each iteration. The factor by which the value(s) of X changes may depend on the CBR or the ratio of aperiodic/periodic traffic or the ratio $X_1$/PDB or a combination thereof.

The factor by which the value of X is changed in each iteration may vary may be based on the network congestion and/or the traffic type. In particular, any one of the following (or a combination thereof) may be the parameters that impact the factor by which X is changed:

a. The value of the channel busy ratio (CBR) that may be observed over the resource pool. In particular, a high CBR indicates that the subchannels are highly occupied. Thus, for example, the factor affecting the value of X may be set lower for low priority traffic and at the same time set higher for the high-priority traffic (e.g., 1% reduction for high-priority traffic and 5% reduction for low-priority traffic). This may result in a higher value of X for high-priority traffic and lower value of X for lower-priority traffic thus reducing the observed interference on higher-priority traffic by a lower value of X for lower-priority traffic at the expense of higher number of collisions for lower-priority traffic.

b. Since different traffic types may be identified by a UE after decoding the SCI, a UE may calculate a ratio between aperiodic and periodic traffic. However, due to the limitation of the SCI signaling capability (32-slot window), a UE may not be able to detect the presence of aperiodic traffic beyond the SCI signaling window. Hence, a high aperiodic/periodic ratio may indicate that the sensing information is limited and is not indicative of the resource reservation beyond the 32-slot SCI signaling window. Subsequently, the factors by which the values of X are changed may be adjusted for different priority traffic types based on the aperiodic/periodic ratio to provide favorable access to certain priorities. For example, the factor by which the value of X is changed may be set higher for higher-priority traffic and reduced for lower-priority traffic. Hence, this provides the higher-priority traffic with more access to the available resources.

c. The ratio of $X_1$/PDB. When this ratio is high, it indicates that the UE is aware of all the reserved resources by all traffic types even when the system is highly occupied by aperiodic traffic. Hence, the factor by which the value of X may be changed may be adjusted accordingly. For example, for high-priority traffic with high $X_1$/PDB, the factor by which the value of X may be changed may be set higher to allow better access to the available resources because the UE is aware of all resource reservations and it is approaching its PDB.

Figure 3B:
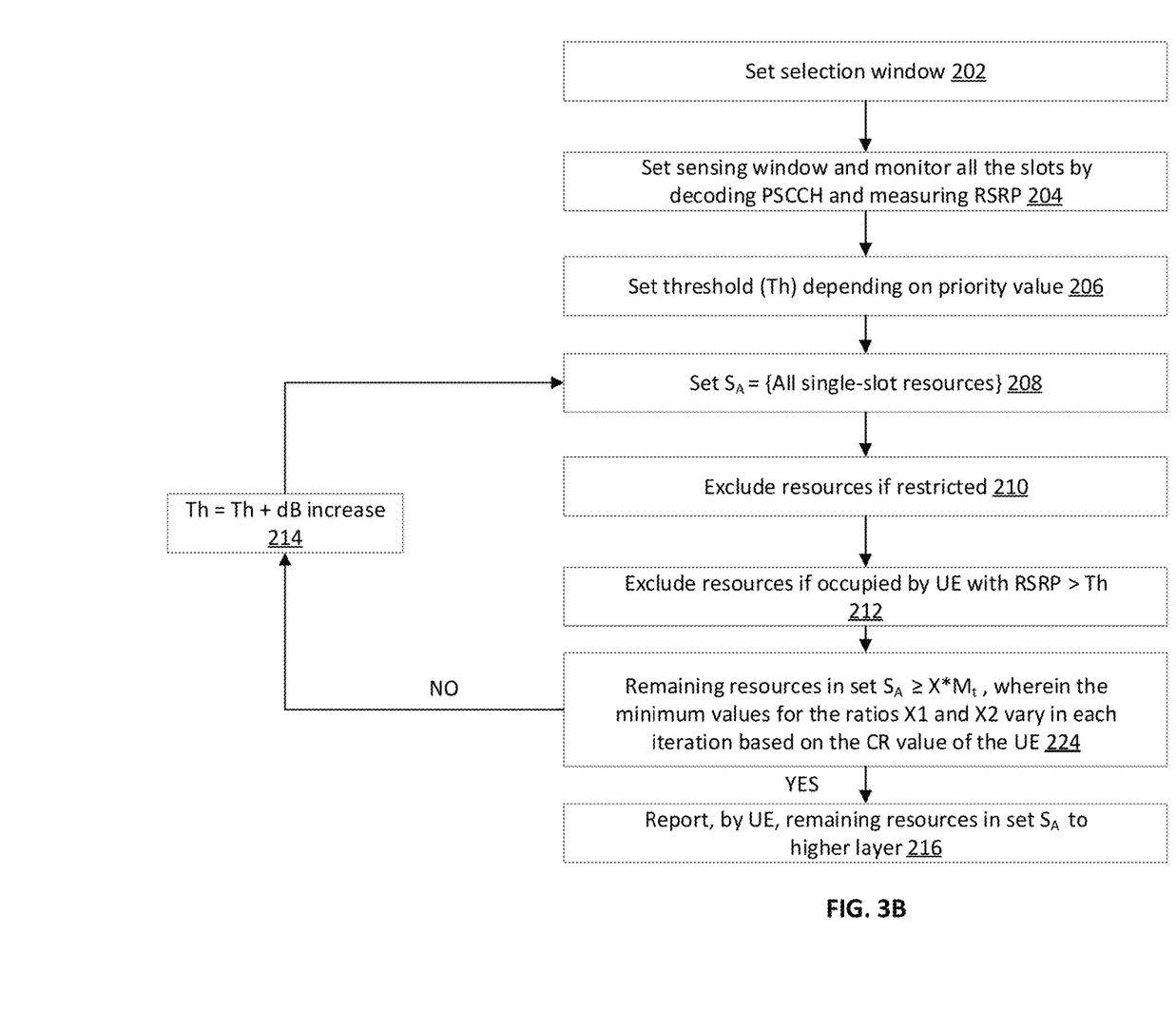
FIG. 3B illustrates a flowchart for a resource selection procedure according to some embodiments.

In FIG. 3B, at step 224, the minimum values for the ratios (e.g., $\{X_1, X_2\}$) may vary in each iteration. The factors by which the values of $X_1$ and $X_2$ change may depend on the CR (channel occupancy ratio) of the UE.

In each iteration of the resource selection procedure, when portions of the resource selection window are considered separately, e.g., $X_1$ and $X_2$, the value(s) of $X_1$ and $X_2$ may be changed based on the channel occupancy ratio (CR) of a given UE. In particular, a UE may set different factors for $X_1$, $X_2$. For example, a UE approaching its $CR_{Limit}$ may decrease the factor by which $X_1$ may be changed while increasing the factor by which $X_2$ may be changed. Subsequently, the UE may have a low value of $X_1$ and a high value of $X_2$ thus pushing upcoming reservations further in the future in order to reduce its CR value.

Figure 4:
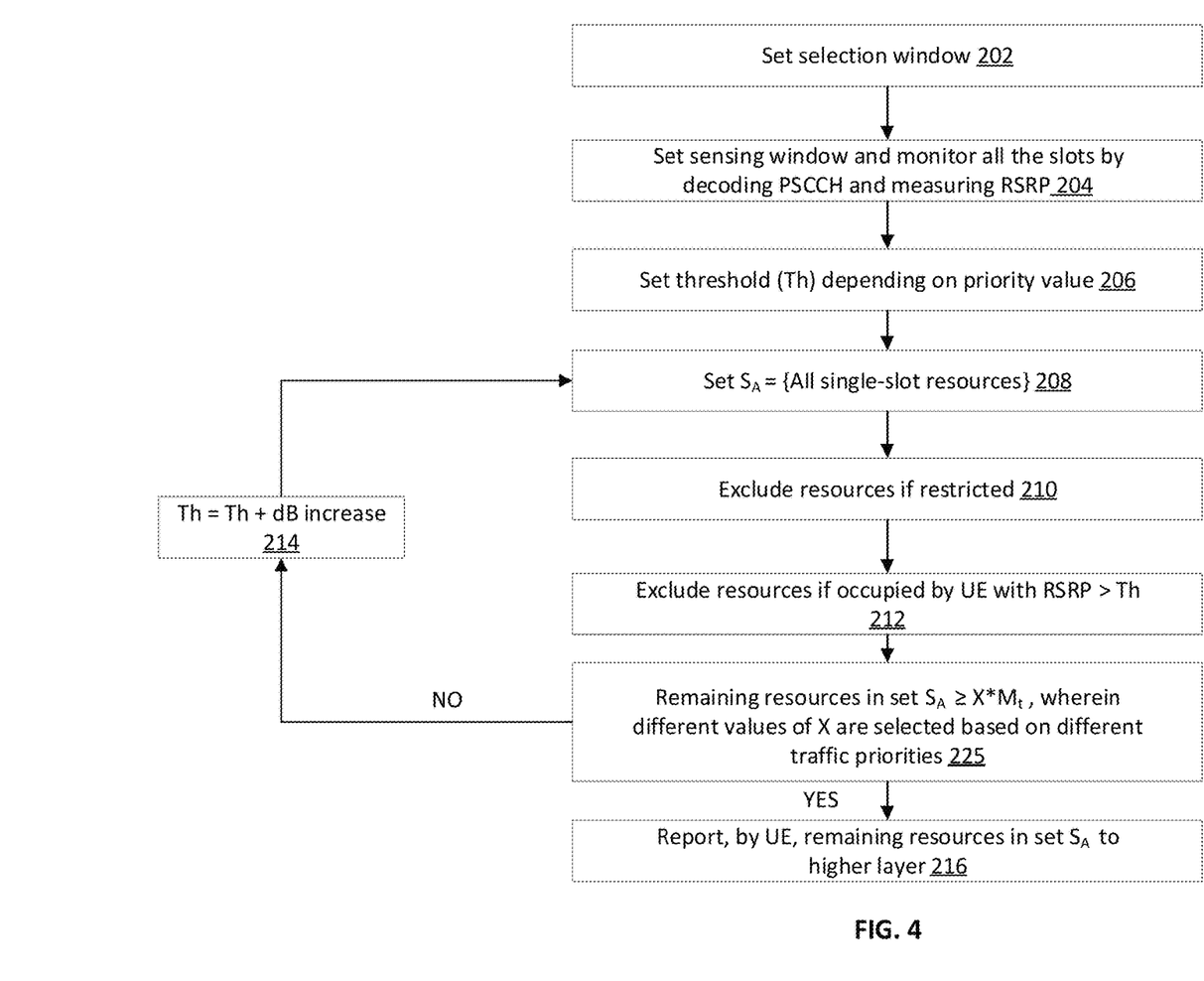
FIG. 4 illustrates another flowchart for a resource selection procedure according to some embodiments.

In FIG. 4, at step 225, the UE or resource selection procedure may initialize different minimum candidate resources ratios, (e.g., X or $\{X_1, X_2\}$ if portions of the resource selection window are considered separately) for different traffic priorities.

In some scenarios, it might be beneficial to have different initial values of X for different traffic priorities. In particular, setting a higher value of X for resource selection enforces the procedure to create a larger set of candidate resources to the higher layers for resource selection. This helps the UE in maintaining the chain integrity and reducing the potential for collision at the expense of higher RSRP thresholds. Hence, the system performance may be improved by initializing the resource selection procedure by different values of X. Additionally the factor by which the value of X changes in each iteration may also depend on the priorities as discussed in Solutions 1 and 2, thus providing the highest flexibility to the system.

One important aspect of resource selection for Mode 2 operation is a minimum number of candidate resources (expressed as a ratio with respect to the total resources within the selection window) that are passed to a higher layer for resource selection. In some embodiments, the following criteria may be used:

In Step 1 of the Mode 2 resource selection procedure, when the ratio of identified candidate resources to the total number of resources in a resource selection window is less than X %, all configured thresholds are increased by 3 dB and the resource identification procedure is repeated X may be 20%, or 35%, or 50%.

RSRP threshold increments do not depend on any other conditions

A minimum value of the ratio between the candidate resources that may be selected to the total number of resources within the resource selection window may be defined as X % or X. In particular, if this ratio is set less than X %, the UE increases its threshold levels 214 in order to increase the resources that can be indicated to the higher layers. In addition, the value of X may be preconfigured per pool per L1 (Layer 1 which is the Physical Layer) priority from a set of 20%, 35% or 50%.

Figure 5:
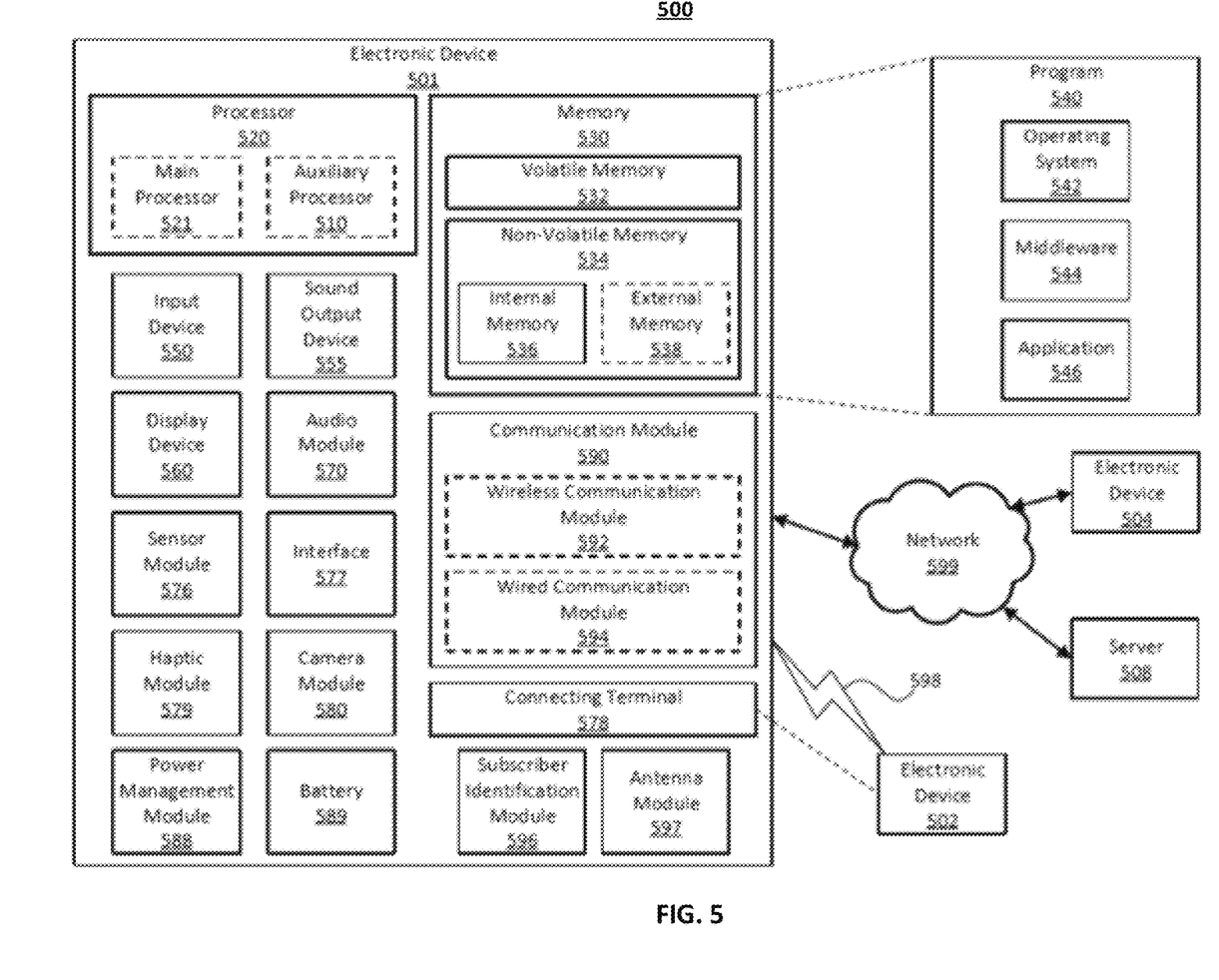
FIG. 5 illustrates an example block diagram of an electronic device and network environment for implementing a Mode 2 resource selection procedure according to some embodiments.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 510 (e.g., a graphics processing unit (GPU), an image signal processor (ISP), a sensor hub processor, or a communication processor (CP)) that may be operable independently from, or in conjunction with, the main processor 521. Additionally or alternatively, the auxiliary processor 510 may be adapted to consume less power than the main processor 521, or execute a particular function. The auxiliary processor 510 may be implemented as being separate from, or a part of, the main processor 521.

The auxiliary processor 510 may control at least some of the functions or states related to at least one component (e.g., the display device 560, the sensor module 576, or the communication module 590) among the components of the electronic device 501, instead of the main processor 521 while the main processor 521 may be in an inactive (e.g., sleep) state, or together with the main processor 521 while the main processor 521 may be in an active state (e.g., executing an application). According to one embodiment, the auxiliary processor 510 (e.g., an image signal processor or a communication processor) may be implemented as part of another component (e.g., the camera module 580 or the communication module 590) functionally related to the auxiliary processor 510.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which may be not rechargeable, a secondary cell which may be rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or server 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that may be readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure may not be determined merely based on the described embodiments, but rather determined based on the accompanying claims and equivalents thereto.

What is claimed is:

1. A method of resource selection, the method comprising:
   setting, by a user equipment (UE), a selection window;
   setting, by the UE, a sensing window and monitoring slots by decoding a physical sidelink control channel (PSCCH) and measuring a reference signal received power (RSRP);
   setting, by the UE, a threshold;
   defining a set of a total number of resources based on the selection window;
   excluding based on the sensing window, by the UE, any restricted resources from the total number of resources;
   excluding based on the threshold, by the UE, any occupied resources from the total number of resources; and
   determining, by the UE, if an initial number of remaining resources is greater than or equal to an initial percentage of the total number of resources.

2. The method of claim 1, comprising reporting the number of remaining resources to a higher layer when the initial number of remaining resources is greater than or equal to the initial percentage of the total number of resources.

3. The method of claim 1, comprising at least one iteration including: increasing the threshold, when the initial number of remaining resources is less than the initial percentage of the total number of resources, and redetermining if a subsequent number of remaining resources is greater than or equal to a subsequent percentage of the total number of resources.

4. The method of claim 3, wherein the subsequent percentage varies for each iteration, wherein a factor by which the subsequent percentage changes depends on an iteration number or a transmission priority.

5. The method of claim 3, wherein the subsequent percentage varies for each iteration and the subsequent percentage is selected from a preconfigured set, wherein the subsequent percentage is based on a priority of a transmission that triggered the resource selection.

6. The method of claim 3, wherein the subsequent percentage varies for each iteration, wherein a factor by which the subsequent percentage changes depends on a channel busy ratio (CBR) or a ratio between aperiodic and periodic traffic.

7. The method of claim 3, wherein the resource selection window is divided into at least a first section with a first percentage and a second section with a second percentage, wherein the first percentage and the second percentage vary in each iteration, respectively.

8. The method of claim 1, wherein the initial percentage is selected from a preconfigured set, based on a traffic priority.

9. The method of claim 1, wherein the occupied resources are occupied by the UE and the corresponding RSRP of the occupied resources is greater than or equal to the threshold.

10. The method of claim 1, wherein the resource selection window is divided into at least a first section with a first percentage and a second section with a second percentage.

11. A system for resource selection, comprising:
   a processor; and
   a memory storing non-transitory processor-executable instructions that, when executed by the processor, cause the processor to:
   set a selection window;
   set a sensing window and monitoring slots by decoding a physical sidelink control channel (PSCCH) and measuring a reference signal received power (RSRP);
   set a threshold;
   define a set of a total number of resources based on the selection window;
   exclude, based on the sensing window, any restricted resources from the total number of resources;
   exclude, based on the threshold, any occupied resources from the total number of resources; and
   determine if an initial number of remaining resources is greater than or equal to an initial percentage of the total number of resources.

12. The system of claim 11, comprising reporting the number of remaining resources to a higher layer when the initial number of remaining resources is greater than or equal to the initial percentage of the total number of resources.

13. The system of claim 12, comprising at least one iteration including: increasing the threshold, when the initial number of remaining resources is less than the initial percentage of the total number of resources, and redetermining if a subsequent number of remaining resources is greater than or equal to a subsequent percentage of the total number of resources.

14. The system of claim 13, wherein the subsequent percentage varies for each iteration, wherein a factor by which the subsequent percentage changes depends on an iteration number or a transmission priority.

15. The system of claim 13, wherein the subsequent percentage varies for each iteration and the subsequent percentage is selected from a preconfigured set, wherein the subsequent percentage is based on a priority of a transmission that triggered the resource selection.

16. The system of claim 13, wherein the subsequent percentage varies for each iteration, wherein a factor by which the subsequent percentage changes depends on a channel busy ratio (CBR) or a ratio between aperiodic and periodic traffic.

17. The system of claim 13, wherein the resource selection window is divided into at least a first section with a first percentage and a second section with a second percentage, wherein the first percentage and the second percentage vary in each iteration, respectively.

18. The system of claim 11, wherein the initial percentage is selected from a preconfigured set based on a traffic priority.

19. The system of claim 13, wherein the occupied resources are occupied by a UE and the corresponding RSRP of the occupied resources is greater than or equal to the threshold.

20. The system of claim 13, wherein the resource selection window is divided into at least a first section with a first percentage and a second section with a second percentage.

* * * * *